United States Patent

Monroy

[11] 3,910,918
[45] Oct. 7, 1975

[54] 1,2-DIHYDROQUINOLINES AND PROCESS AND APPARATUS FOR THE OBTENTION THEREOF

[76] Inventor: Heliodoro Monroy, Insurgentes Sur 591-7°piso, Mexico, 18 D.F.

[22] Filed: Feb. 9, 1973

[21] Appl. No.: 331,210

Related U.S. Application Data

[62] Division of Ser. No. 137,217, April 26, 1971, abandoned.

[52] U.S. Cl.... 260/283 SY; 260/283 R; 260/287 R; 260/289 R; 424/258
[51] Int. Cl.²............... C07D 215/18; C07D 215/20
[58] Field of Search....... 260/283 R, 287 R, 283 SY

[56] References Cited
UNITED STATES PATENTS

| | | | |
|---|---|---|---|
| 2,095,126 | 10/1937 | Craig | 260/283 SY |
| 2,530,774 | 11/1950 | Kehe et al. | 260/283 R |

FOREIGN PATENTS OR APPLICATIONS

| | | | |
|---|---|---|---|
| 678,190 | 1/1964 | Canada | 260/283 R |

OTHER PUBLICATIONS

Khidekel et al., Chemical Abstracts; Vol. 62, 1962, p. 2389a.

*Primary Examiner*—Donald G. Daus
*Assistant Examiner*—Mary C. Vaughn
*Attorney, Agent, or Firm*—Bacon & Thomas

[57] ABSTRACT

Novel substituted 1,2-dihydroquinolines have antioxidant, bactericidal and fungicidal properties. Said 1,2-dihydroquinolines are prepared by condensing, in the presence of a catalyst, preferably iodine, a substituted aromatic amine with a carbonyl compound, at a termperature of between 90° and 300°C., said catalyst being preferably present together with an activator selected from alkyl or alkaryl halides. Said process is preferably carried out in an apparatus essentially comprising a mixing and feeding device, a first reactor being a packed tower of a height sufficient to provide for the necessary residence time of the reaction mixture in continuous ascending flow therethrough, a second reactor being a packed tower of lesser height, through which the partially reacted mixture descends an evaporator to evaporate the unreacted aromatic amine from the substituted 1,2-dihydroquinoline obtained, and means for stripping the light fractions evolved in the first reactor and in the evaporator and reusing the same as starting materials.

3 Claims, 1 Drawing Figure

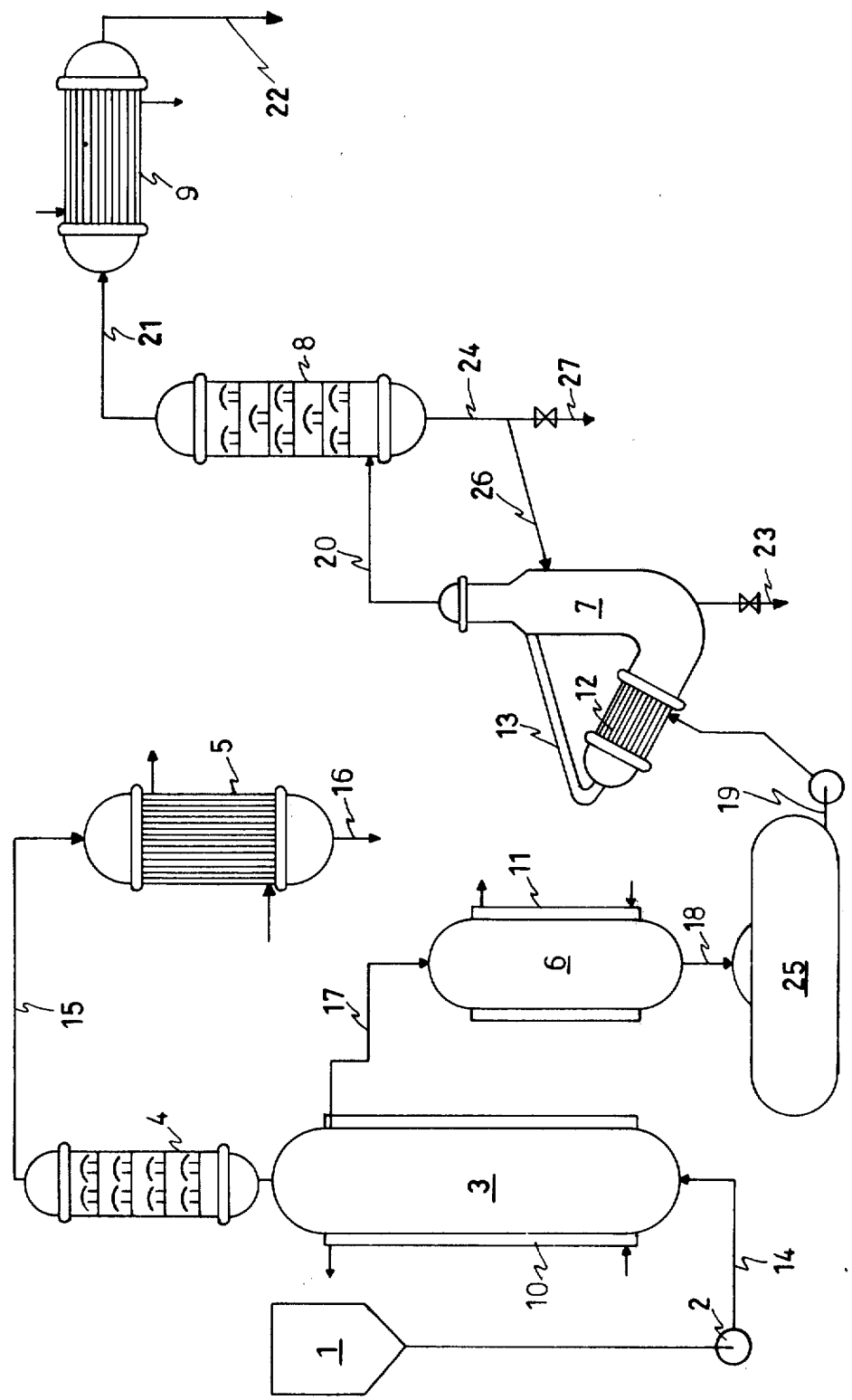

3,910,918

1,2-DIHYDROQUINOLINES AND PROCESS AND APPARATUS FOR THE OBTENTION THEREOF

This is a division of application Ser. No. 137217 filed April 26, 1971, now abandoned.

BACKGROUND OF THE INVENTION

The present invention refers to new 1,2-dihydroquinolines and, more particularly, it is related to new substituted 1,2-dihydroquinolines having excellent antioxidant, bactericidal, insecticidal and fungicidal properties, and to a novel process and novel apparatus for the preparation of substituted 1,2-dihydroquinolines.

The dihydroquinolines in accordance with the present invention are compounds having high antioxidant and pesticidal properties and generally protect various materials against alterations caused by oxygen and by the influence of insects, fungi, bacteriae and other types of parasites.

The dihydroquinolines in accordance with the present invention are represented by the following general formula

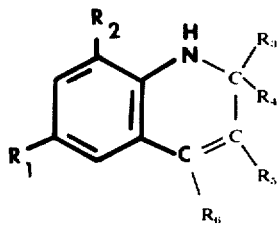

wherein $R_1$ is hydrogen, hydroxy, lower alkoxy, nitro or halogen; $R_2$ is hydrogen, nitro halogen, alkyl, aryl or carboxyalkyl; $R_3$ is hydrogen or alkyl; $R_4$ is alkyl or aralkyl; $R_5$ is hydrogen or alkyl; and $R_6$ is hydrogen, alkyl or alkaryl.

Dihydroquinolines are highly susceptible to decoloration by the action of the ambient oxygen. For instance, prior publications disclose 1,2-dihydro-2,2,4-trimethylquinoline and 1,2-dihydro-2,2,4-trimethyl-6-ethoxyquinoline as products which are considerably degradated and which suffer intensive decolorations with time. Prior publications particularly describe 1,2-dihydro-2,2,4-trimethyl-6-ethoxyquinoline as a brown colored product, but it is quite obvious that such a color is due to the action of the oxygen thereon.

However, it is believed that the intensive decoloration of the prior art dihydroquinolines is mainly due to impurities present in such products, inasmuch as, upon carefully distilling the above mentioned dihydroquinolines, it is found that they are then much less sensitive to the attack by the oxygen and therefore this proves that, the purer the compound, the less sensitive to the oxygen it is. It is quite probable, therefore, that impurities contained in the commercially available products, are the main cause of decolorations, because said impurities facilitate attack by the oxygen which causes a fast decoloration of said products when the same have not been redistilled.

These compounds can be polymerized through the use of acidic catalysts such as aluminum chloride, boron trifluoride or phosphoric acid in order to produce highly effective antioxidants for rubber and related polymers.

SUMMARY OF THE INVENTION

Having in mind the defects of the prior art dihydroquinolines, it is an object of the present invention to provide new substituted 1,2-dihydroquinolines having highly improved characteristics against decoloration, without the need of having resort to costly purifying procedures.

It is another object of the present invention to provide novel substituted 1,2-dihydroquinolines having high antioxidant, bactericidal, insecticidal and fungicidal properties.

A further object of the present invention is to provide 1,2-dihydroquinolines of the above mentioned character, which will also have an extremely low toxicity to render them useful for their incorporation in food products.

Another object of the present invention is to provide a novel process for the preparation of substituted 1,2-dihydroquinolines, which is of simpler operation as well as of highly economical characteristics.

A further object of this invention is to provide a process of the above mentioned character, which will require a reaction period quite shorter than conventional processes, through the use of suitable catalysts.

It is another object of the present invention to provide an apparatus for carrying out a process of the above mentioned character in a continuous manner to produce substituted 1,2-dihydroquinolines.

BRIEF DESCRIPTION OF THE DRAWING

The novel features that are considered characteristic of the present invention are set forth with particularity in the appended claims. The invention itself, however, both as to its organization and its method of operation, together with additional objects and advantages thereof, will best be understood from the following description of a specific embodiment, when read in connection with the accompanying drawing, in which:

The single FIGURE is a flow sheet diagramatically representing the procedural steps and the preferred apparatus used to prepare substituted 1,2-dihydroquinolines.

DETAILED DESCRIPTION OF THE INVENTION

The process in accordance with the present invention comprises, broadly speaking, condensing, in the presence of suitable catalysts, aromatic amines with aldehydes or ketones containing the group —CO—CH$_2$—.

The condensation reaction is preferably effected at high temperatures, such as between 90° and 300°C., and for a period of time of from about 3 to about 12 hours, which conditions are obtained by feeding a cold mixture of the amine, the carbonyl compound and the catalyst into the bottom of a packed tower of sufficient height to provide for a suitable residence time of the reacting mixture, said packed tower being provided with heating means to obtain the desired reaction temperature. A mixture of the carbonyl compound and water is evolved and the carbonyl compound is recovered by fractional distillation to be dried and reused as a starting material in the process.

A mixture of the desired dihydroquinoline product and unreacted aromatic amine is obtained through the bottom of a secondary reactor fed from the first reactor by the top thereof, and said mixture is distilled to recover the aromatic amine and thus purify the 1,2-dihydroquinoline product.

The process for the obtention of the 1,2-dihydroquinolines according to the present invention can be represented by the following equation:

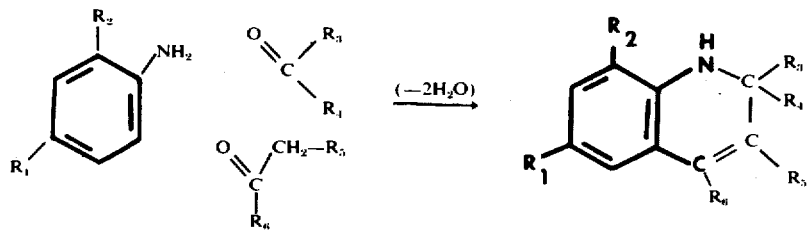

wherein $R_1$ is hydrogen, hydroxy, lower alkoxy, nitro or halogen; $R_2$ is hydrogen, nitro, halogen, alkyl, aryl or carboxyalkyl; $R_3$ is hydrogen or alkyl; $R_4$ is alkyl or aralkyl; $R_5$ is hydrogen or alkyl; and $R_6$ is hydrogen, alkyl or alkaryl.

Any aromatic amine having the above disclosed formula can be used to carry out the process of the present invention, but highly preferable starting compounds are aniline, p-chloroaniline and p-phenetidine for the obtention of substituted 1,2-dihydroquinolines in accordance with the present invention.

Any carbonyl compound represented by the formula disclosed in the above equation can also be used, but the following are preferable: Acetone, methyl ethyl ketone, methyl isobutyl ketone and butyraldehyde.

The catalysts preferred to carry out the condensation reaction which forms the main object of the present invention are iodine, p-toluenesulfonic acid and sulfanilic acid, with iodine being the preferred catalyst in view of the fact that it produces the highest yields and requires the shortest reaction periods. Highly preferably, the above catalysts are used in admixture with an activator selected from alkyl or alkenyl halides such as ethylene dichloride, dichloroethylene, trichloroethylene and the like.

The preferred amount of catalyst used in the reaction is of from about 1% to 4%, preferably about 3% by weight on the weight of the aromatic amine.

The activator is desirably added to the catalyst in an amount of from 13% to 80%, preferably about 70% by weight on the weight of catalyst used.

While anyone skilled in the art will clearly understand that the above mentioned process can be effected in any convenient manner such as by letting the starting materials interact in the presence of the catalyst in a batch-type reactor, the present invention contemplates a continuous process which is preferably carried out in an installation of the type diagramatically shown in the single FIGURE of the drawings.

Having now more particular reference to the drawing, the apparatus for the continuous manufacture of the 1,2-dihydroquinolines of the present invention comprises a mixing vessel 1, a metering feed pump 2, a first reactor 3, a fractional distillation column 4, a condenser 5, a second reactor 6, a surge tank 25, a circulating evaporator 7, a fractional distillation column 8 and a condenser 9.

Reactor 3 is a packed tower provided with external heating means such as an oil jacket 10 or the like, with a suitable packing such as Raschig rings, stainless steel mesh rolls or the like, to provide for a large contacting area, and the height of the column is designed such that a suitable residence time is provided to effect the condensation reaction. Reactor 6 is similar to reactor 3, being a packed tower of a shorter length provided with external heating means such as an oil jacket 11 in order to keep the temperature within the specified desired range.

The process in accordance with the present invention is carried out as follows:

Suitable proportions of the aromatic amine, the carbonyl compound, the catalyst and, if desired, the activator, are continuously fed into the mixing vessel 1 wherein a homogeneous mixture of said ingredients is obtained. The metering feed pump 2 meters a controlled flow of the reaction mixture from vessel 1 into the bottom of reactor 3 through line 14. The mixture is heated to the desired temperature of between about 90° to 300°C., depending on the starting materials used and on the product desired. A mixture of the volatile carbonyl compound and water is vaporized and distilled through the fractionating column 4, in which the higher boiling compounds including water are recycled to reactor 3 while the carbonyl compound is carried through line 15 to a suitable condenser 5, from which the liquid carbonyl compound is removed through line 16 to be reused in the process.

The liquid component of the reaction mixture is discharged through the overflow line 17 to the top of the second reactor 6 in which the reaction is completed, with the product mixed with unreacted aromatic amine being discharged through line 18.

The mixture of the dihydroquinoline, water and unreacted aromatic amine is received in a surge tank 25 from which it is discharged through line 19 into a circulating convection evaporator 7 which operates in a batch-like manner.

The evaporator 7 comprises an inclined pipe bundle 12 at which lower end the mixture of 1,2-dihydroquinoline, water and aromatic amine is fed and circulated through the pipe 13 by means of the convection current created by the pipe bundle 12. The aromatic amine, water and other impurities are evaporated and received in fractionating column 8 through line 20 to be furtherly purified. The heavier fraction consisting of the 1,2-dihydroquinoline entrained in the vapors is removed from the bottom of column 8 through line 24, either to be recycled to the evaporator or to be removed as the final product, through line 27, while the lighter fraction comprising aromatic amine, water and other impurities is vaporized through line 21 and furtherly condensed in condenser 9, whence it is discharged in liquid form through line 22 to be rectified or else reused in the process. The desired product can also be discharged through line 23 from evaporator 7 at suitable intervals.

It will be thus seen that the process for the production of 1,2-dihydroquinolines effected in the apparatus in accordance with the present invention may be considered as a continuous process having a remarkable efficiency and comprising a reaction period of not more than a small fraction of the period of time necessary in a conventional reactor. Also, the design of the continuous reactor of the present invention avoids undue polymerization and resinification of the product formed, in view of the fact that the reaction mixture is subjected to high temperatures only a relatively short time.

The present invention will best be understood by the following illustrative examples, which must be construed as merely illustrative and not restrictive of the true scope of the invention.

EXAMPLE 1

Preparation of 1,2-dihydro-2,2,4-trimethylquinoline 35 g of metallic iodine, 24 g of trichloroethylene and 2040 g off aniline are jointly dissolved in 4020 g of acetone and the mixture is pumped to reactor 3 of the accompanying drawing at a rate of flow suitable to provide a residence time of about 3.5 hours. The jackets of the reactors are fed with heating oil to raise the temperature of the reaction mixture to about 160°C.

A mixture of water, acetone and aniline is fed to column 4 and practically pure acetone is removed in the form of vapors to be condensed in condenser 5 whence the acetone is recirculated to the process.

The mixture of unreacted aniline and the product obtained is received in the surge tank 25 and then evaporated and rectified in order to purify the product and remove water and the aniline, to be reused in the process.

The reaction effected in accordance with this example can be represented by the following equation:

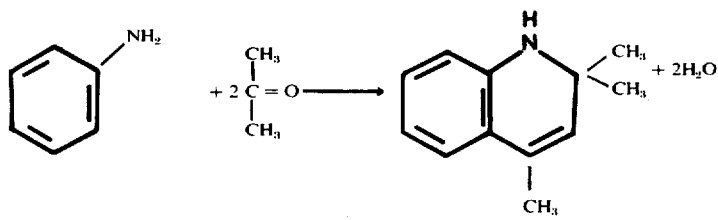

The 1,2-dihydro-2,2,4-trimethylquinoline obtained is a brown colored product having a refractive index at 23°C. of 1.582, a boiling point at 0.1 mm of mercury of 94° to 96°C. and a specific gravity at 22°C. of 0.9430. The conversion rate per pass calculated on the aniline feed was approximately 45%.

The product obtained is an antioxidant having parasiticide properties, which can be polymerized to enhance its stability and activity.

EXAMPLE 2

Preparation of 1,2-dihydro-2,3,4-trimethyl-2-ethylquinoline

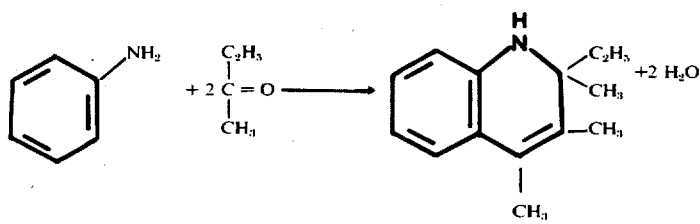

In the same manner described in example 1, 40 g of iodine, 28 g of ethylene dichloride, 2040 g of aniline and 5000 g of methyl ethyl ketone are reacted at a temperature of 185°C. for a period of about 5 hours and 40 minutes.

The 1,2-dihydro-2,3,4-trimethyl-2-ethylquinoline thus obtained is a yellow liquid having a refractive index at 24°C. of 1.571, a boiling point at 0.1 mm of mercury of 110° to 112°C. and a specific gravity at 23.5°C. of 0.9712. The conversion rate per pass calculated on the aniline feed is of about 37%.

The product obtained is an excellent antioxidant having remarkable parasiticide properties.

EXAMPLE 3

Preparation of 1,2-dihydro-2,2,4-trimethyl-6-ethoxyquinoline

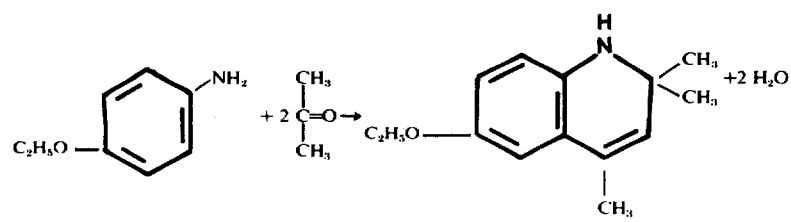

45 g of metallic iodine, 9 g of trichloroethylene, 3000 g of p-phenetidine and 4020 g of acetone are reacted in the same manner described in Example 1 at a temperature of about 205°C. and at a rate of flow suitable to provide for a residence time of about 4 hours and 40 minutes.

The 1,2-dihydro-2,2,4-trimethyl-6-ethoxyquinoline obtained was a light yellow to amber colored liquid having a refractive index at 20°C. of 1.568, a boiling point at 0.1 mm of mercury of 134° to 136°C. and a specific gravity at 21°C. of 1.031. The conversion rate per pass calculated on the p-phenitidine was about 40%.

The product obtained proved to be an excellent antioxidant having remarkable insecticide, fungicide and bactericide properties, which can be polymerized to enhance its stability and activity.

EXAMPLE 4

Preparation of
1,2-dihydro-2,3,4-trimethyl-2-ethyl-6-ethoxyquinoline

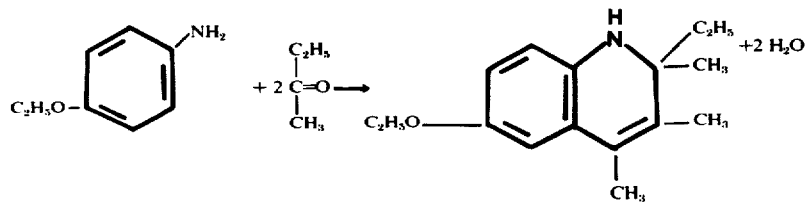

In the same manner described in Example 1, 30 g of iodine, 21 g of dichloroethylene, 200 g of p-phenetidine and 3500 g of methyl ethyl ketone are reacted at a temperature of about 220°C. and for a period of about 5 hours and 20 minutes.

The 1,2-dihydro-2,3,4-trimethyl-2-ethyl-6-ethoxyquinoline obtained was a yellow to light amber colored liquid having a refractive index at 23°C. of 1.560, a boiling point at 0.1 mm of mercury of 139° to 141°C and a specific gravity at 23.2°C. of 0.9858. The conversion rate per pass calculated on the p-phenetidine was of about 38.5%.

The product obtained produced excellent results as an antioxidant and possessed good parasiticide properties.

EXAMPLE 5

Preparation of 1,2-dihydro-2n-propyl-3-ethylquinoline

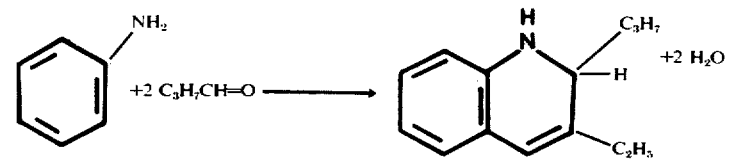

40 g of sulphanilic acid, 2040 g of aniline and 5000 g of n-butyraldehyde are reacted in the same manner described in example 1, at a temperature of about 180°C. for a period of about 10 hours.

In this particular case iodine and unreacted n-butyraldehyde and aniline are not separately obtained but, on the contrary, the aniline completely reacts forming three different products. The first product is the Schiff base formed between the aniline and the butyraldehyde, represented by the formula $$C_6H_5-N=CH-(CH_2)_2-CH_3$$

having a boiling point at 0.1 mm of mercury of 98° to 105°C. The second product is the desired 1,2-dihydro-2-n-propyl-3-ethylquinoline and the third product is a resinuous soft residue probably comprising a polymerization product of the substituted dihydroquinoline due to the rather long reaction period necessary in this particular case.

The desired product is purified by decantation of the solid residue in the surge tank 25 and is then evaporated and fractionally distilled in order to separate it from the Schiff base, with the latter being reused to continue the reaction for additionally forming the substituted dihydroquinoline.

The 1,2-dihydro-2-n-propyl-3-ethylquinoline obtained was a light lemon green colored liquid having a refractive index at 23°C. of 1.570, a boiling point at 0.1 mm of mercury of 120° to 122°C. and a specific gravity at 22.5°C. of 0.9776. The conversion rate per pass calculated on the aniline feed was about 35%.

The product obtained was an excellent antioxidant having very good parasiticide properties.

EXAMPLE 6

Preparation of
1,2-dihydro-2-n-propyl-3-ethyl-6-ethoxyquinoline

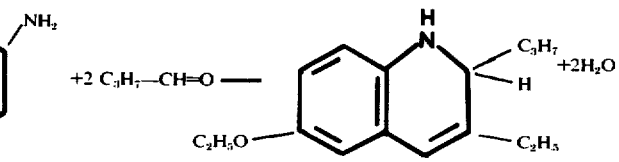

In the same manner described in example 5, a mixture of 30 g of p-toluene sulfonic acid, 2000 g of p-phenetidine and 4400 g of n-butyraldehyde is reacted at a temperature of about 220°C. and for a period of 4 hours and 15 minutes.

In this particular case the Schiff base of the p-phenetidine and butyraldehyde is also obtained having the formula $C_2H_5O-C_6H_4-N=CH-CH_2-CH_2-CH_3$ with a boiling point at 0.1 mm of mercury of 140° to 145°C. Also, of course, the desired 1,2-dihydro-2-n-propyl-3-ethyl-6-ethoxyquinoline is formed.

The desired product is fractionally distilled under vacuum in order to purify it and remove the Schiff base, the latter being recirculated to the reaction to additionally form the desired dihydroquinoline.

The 1,2-dihydro-2-n-propyl-3-ethyl-6-ethoxyquinoline obtained was a light lemon green colored liquid with a refractive index at 20°C. of 1.559, a boiling point at 0.1 mm of mercury of 154° to 158°C. and a specific gravity at 22.7°C. of 1.0006. The yield on the p-phenetidine feed was about 33%.

The product obtained was an excellent antioxidant with very good parasiticide properties.

EXAMPLE 7

Preparation of
1,2-dihydro-2,2,4-trimethyl-6-chloroquinoline

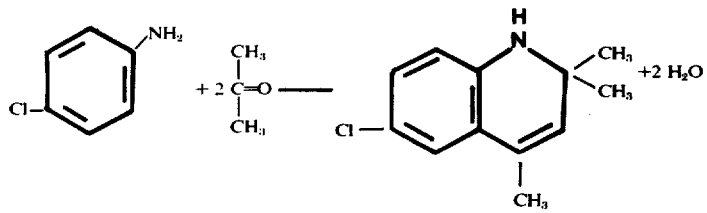

In the same manner described in example 1 a mixture of 22 moles of p-chloroaniline, 70 moles of acetone with 2% of p-toluene sulfonic acid and 1.4% of ethylene dichloride were reacted at a temperature of about 180°C. for a period of about 5 hours.

The 1,2-dihydro-2,2,4-trimethyl-6-chloroquinoline obtained was an amber colored solid with a melting point of 48° to 49°C. and a boiling point at 0.1 mm of mercury of 134° to 137°C.

The product obtained was a good antioxidant having parasiticide properties.

EXAMPLE 8

Preparation of
1,2-dihydro-2,3,4-trimethyl-2-ethyl-6-chloroquinoline

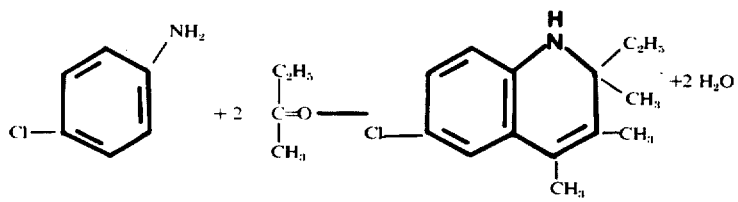

In the same manner described in example 1, a mixture of 22 moles of p-chloroaniline, 70 moles of methyl ethyl ketone, 2% of iodine and 1.4% of trichloroethylene were reacted at a temperature of about 180°C. for a period of about 5.5 hours.

The 1,2-dihydro-2,3,4-trimethyl-2-ethyl-6-chloroquinoline obtained was an amber colored solid with a melting point of 48° to 49°C. and a boiling point at 0.1 mm of mercury of 155°C.

The product obtained was a good antioxidant having parasiticide properties.

EXAMPLE 9

Preparation of
1,2-dihydro-2,2,4-trimethyl-8-nitroquinoline

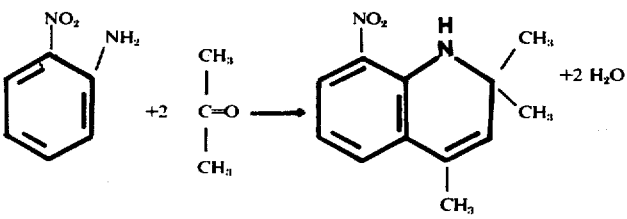

In the same manner described in example 1 a mixture of 22 moles of o-nitroaniline, 70 moles of acetone with 2% of p-toluene sulfonic acid and 1.4% of ethylene dichloride was reacted at a temperature of about 180°C. for a period of about 4.5 hours.

The 1,2-dihydro-2,2,4-trimethyl-8-nitroquinoline obtained was an amber colored solid with a melting point of about 60°C. and a boiling point at 0.1 mm of mercury of about 150°C.

The product obtained was a good antioxidant having parasiticide properties.

EXAMPLE 10

Preparation of
1,2-dihydro-2,4-dimethyl-2-isobutyl-3-isopropylquinoline

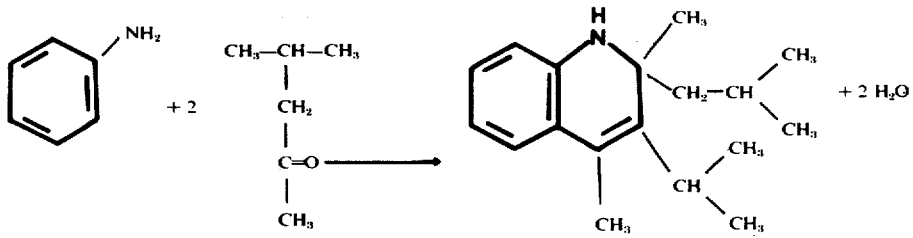

In the same manner described in example 1, a mixture of 22 moles of aniline, 70 moles of methyl isobutyl ketone, 2% of metallic iodine and 1.4% of ethylene dichloride was reacted at a temperature of 180°C. for a period of about 6 hours.

The 1,2-dihydro-2,4-dimethyl-2-isobutyl-3-isopropylquinoline obtained was an orange yellowish colored liquid having a refractive index at 23°C. of 1.550, a boiling point at 0.1 mm of mercury of 140° to 145°C. and a specific gravity at 19°C. of 0.9063.

The product obtained was an excellent antioxidant with very good parasiticide properties.

From the above it will be clearly seen that a highly improved and efficient process has been provided for the obtention of substituted 1,2-dihydroquinolines having excellent antioxidant properties and also being very good fungicides, insecticides and bactericides. Also, a novel apparatus to carry out the above described process has been provided, in which the continuous efficient production of the substituted 1,2-dihydroquinolines of the present invention can be effected with increased efficiency and reduced reaction times, thus producing very high quality compounds.

I claim:

1. In a process for the preparation of 1,2-dihydroquinolines of the formula

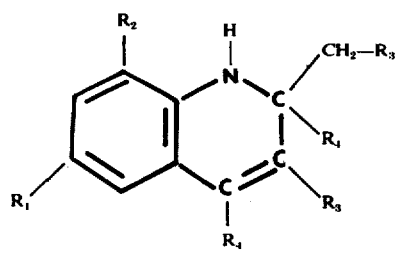

wherein $R_1$ is hydrogen, hydroxy, $C_1$ to $C_4$ alkoxy, nitro, or halogen; $R_2$ is hydrogen, nitro, halogen, $C_1$ to $C_4$ alkyl, $C_6$ or $C_{10}$ carbocyclic aryl or $C_2$ to $C_4$ carboxy alkyl; $R_3$ is hydrogen or $C_1$ to $C_5$ alkyl; and $R_4$ is hydrogen, $C_1$ to $C_4$ alkyl or $C_7$ to $C_{12}$ aralkyl or alkaryl wherein the aryl portions are carbocyclic aryl groups as defined above by condensing an aromatic amine of the formula

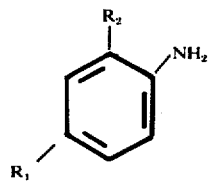

wherein $R_1$ and $R_2$ are as above, with a substituted carbonyl compound having the formula

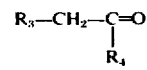

wherein $R_3$ and $R_4$ are as above, the improvement comprising effectuating the condensation reaction in the presence of condensation catalyst selected from the group consisting of iodine, p-toluene sulfonic acid and sulfanilic acid and an activator selected from the group consisting of ethylene dichloride, dichloroethylene, and trichloroethylene wherein the amount of said condensation catalyst ranges between about 1% and 4% by weight with respect to the aromatic amine and wherein the amount of said activator ranges between about 13% and 80% by weight with respect to said condensation catalyst whereby the relative amount of said substituted carbonyl compound required for the completion of the condensation reaction with said aromatic amine does not exceed a molar ratio of about 3.33 moles of carbonyl compound for each mole of aromatic amine in the reaction system.

2. A process according to claim 1 wherein the condensation reaction is effected at a temperature of from 90° to 300°C. for a period of time of from about 3 to 6 hours.

3. A process according to claim 1 wherein the molar ratio of substituted carbonyl compound to aromatic amine is substantially between 3.16 and 3.33 moles.

* * * * *